3,578,613
ADHESIVE DIP COMPRISING A RUBBER LATEX AND TRIS(DIPHYDROXYBENZYL) PHENOL
Wun T. Tai, Monroeville, Pa., assignor to Koppers Company, Inc.
No Drawing. Filed Nov. 29, 1968, Ser. No. 780,278
Int. Cl. C08c 9/16; C08d 9/10
U.S. Cl. 260—3        5 Claims

ABSTRACT OF THE DISCLOSURE

Adhesive dips containing tris(dihydroxybenzyl)phenol are used to bond textile cords to rubber. The adhesive dips are useful for the bonding of nylon, rayon, and the especially difficult to bond polyester tire cords to rubber, giving excellent adhesive properties.

BACKGROUND OF THE INVENTION

Heretofore, it has been the practice to use various different adhesive dips and adhesive resins for the bonding of different types of tire cords to rubber. For example, numerous resinous materials are available for the bonding of nylon or rayon cord to rubber, such as conventional resorcinol-formaldehyde resins; for example, that described in U.S. 2,385,372. Such adhesives, however, have been found to be unsuited for the bonding of polyester fibers as a reinforcement for rubber articles. This is probably due to the fact that polyester fibers, although they exhibit high tensile strength, absorb less moisture than nylon or rayon, and stretch less than other fibers, have been difficult to bond to rubber because of the inability to proper wetting and penetration of the fibers with adhesive. Therefore, adhesives for the bonding of polyester cord to rubber must overcome problems such as insufficient bond strength, poor heat resistance, poor flex life and difficulty of application. These problems have led to the production of specifically tailored resin adhesives to be used with polyesters while employing other adhesive materials for the bonding of nylon or rayon cord to rubber.

It has now been found that an adhesive dip may be formed using tris(dihydroxybenzyl)phenol as the resin former, or in minor amounts in conjunction with a conventional resin, and these adhesive dips, while providing excellent bonding for polyester fibers to rubber, also provide excellent bonding of nylon or rayon cords to rubber material. Thus, a single adhesive system has been found which can be used indiscriminately regardless of the tire cord fiber which is to be bonded to rubber stock in the formation of tires.

SUMMARY OF THE INVENTION

Adhesive dips useful in the bonding of rayon, nylon and polyester tire cords to rubber stock comprise an aqueous mixture of a rubber latex, tris(dihydroxybenzyl)phenol, the tris(dihydroxybenzyl)phenol being present in an amount of about 10–50 parts per 100 parts of rubber in said latex, sufficient alkali to provide a pH of about between 7.0–13.5 and sufficient water to adjust the solids content of the aqueous mixture to about 8–25% by weight. If desired, the adhesive dip may contain a conventional polyester adhesive resin solution, with the tris(dihydroxybenzyl)phenol being present in an amount of about 5–30% by weight based upon said conventional resin.

DETAILED DESCRIPTION

The adhesive dips of the present invention contain a novel resin former, tris(dihydroxybenzyl)phenol. Tris(dihydroxybenzyl)phenol and its method of preparation are described in my copending application Serial No. 780,210, filed Nov. 29, 1968, entitled: "Tris(dihydroxybenzyl)phenol," filed even date herewith. This novel resin former has been found to be useful in the formation of adhesive dips which can be used to bond polyester, nylon, and rayon tire cords to rubber stock in the formation of tires, and provides a single adhesive useful for the various cords.

The adhesive dip is made by forming an aqueous alkaline solution of tris(dihydroxybenzyl)phenol and a suitable rubber latex. The tris(dihydroxybenzyl)phenol is preferably diluted with sufficient water to reduce the concentration and the latex is then added to this aqueous solution.

The rubber latex useful in the adhesive dips of the present invention are the conventional rubber latices used in the formation of rubber adhesive dips. Such latices include vinylpyridine-styrene-butadiene terpolymer latices as well as hot polymerized (2000 Series) styrene-butadiene latices, cold polymerized (2100 Series) styrene-butadiene latices, natural latex, reclaimed rubber dispersions, butyl rubber dispersions or ethylene-propylene-butadiene terpolymer rubber dispersions.

The resin to rubber ratio of the adhesive dips should range between 10–50 parts resin former per 100 parts of rubber solids, that is the amount of rubber, on a dry basis, in the latex. Less than about 10 parts will provide insufficient adhesion, whereas greater than about 50 parts resin per 100 parts rubber is economically undesirable.

The resin adhesive dip, in aqueous solution, normally contains about 8–25% solids. Preferably, about 10% total solids is desired in the aqueous mixture, with additional water being added if necessary, to achieve the desired solids content. The term "solids" as used in determining the solids content of the dip is used to define the amount of rubber and the amount of resin added, i.e., the nonvolatile portion of the dip.

The aqueous dips of the present invention should be adjusted to a pH of about between 7.0 and 13.5. Such pH adjustment may be made by the addition of an aqueous caustic solution such as sodium hydroxide or the addition of ammonium hydroxide to the adhesive dip to arrive at the desired pH. However, if the composition has added thereto a vinylpyridine latex (pH 10.2) the dip may not require further pH adjustment. Too high pH values should be avoided because of the danger of attack on the fiber material used in the cord.

The dips thus prepared are ready for immediate use, or because of their stability, they may be held for as long as a two-week period, which is beyond normal storage requirements in commercial practice.

In another embodiment of the present invention, the tris(dihydroxybenzyl)phenol may be added to a conventional polyester adhesive dip containing a conventional polyester resin solution and latex. The tris(dihydroxybenzyl)phenol is added to the conventional resin solution in an amount of about 5–30% by weight based on the amount of resin, and will provide increased adhesion of the tire cord material to the rubber stock.

The polyester tire cord resin to which the tris(dihydroxybenzyl)phenol may be added may be any of those known in the art for bonding of polyester tire to rubber. Particularly good results are obtained using a butyraldehyde-resorcinol-formaldehyde resin such as the preparation of which is described in U.S. 3,242,118, or the resin described in copending application of R. H. Moult et al., Ser. No. 638,560, filed May 16, 1967, now U.S. 3,431,241.

The adhesive dips of the present invention are especially useful for the bonding of polyester, nylon, or rayon tire cord, but also provide a single adhesive dip which may be used for the bonding of various other types of tire cord material to rubber, such as polyolefin, glass or metal cords with good results.

The dip cords, coated with the adhesive dip of the present invention may be bonded to various kinds of rubber substrates including natural rubber, styrene-butadiene rubber, polybutadiene, butylene-ethylene-propylene terpolymers, and the new synthetic-natural polyisoprene rubbers.

The successful bonding of rubber to tire cord is measured by the static adhesion test. The H-test has been employed by the rubber industry to determine the static adhesion of textile cord to rubber. This is specified as ASTM D2138–67 and was employed in testing the adhesive dips in the present invention. The H-test is the method for the measurement of the force necessary to pull a single cord axially from a small block of rubber in which it is embedded. Ideally, the shear strength of the adhesive film rubber or the adhesive film cord inner base would be measured. In performing the tests, two small blocks of rubber are bonded to an interconnecting cord to form a specimen which resembles the letter H, thus characterizing the test. The rupture is effected by pulling the specimens apart by means of two-hood clamps, failure occurring when the bond in either of the blocks is ruptured. The data, of course, evaluated as to the size of the specimen and temperature at which the test is performed.

The invention is further illustrated by the following examples wherein parts are parts by weight unless otherwise indicated.

EXAMPLE I

To a nitrogen-purged Patterson-Kelley, 15-gallon kettle, there was charged 32.5 lbs. (0.296 lb. mole) of resorcinol. After the resorcinol was heated until melted, the agitator was started and the temperature increased to 190° C. This (methoxymethyl)phenol, 20.0 lbs. (0.088 lb. mole) was added at a constant rate over a period of 100 minutes while maintaining the temperature of the reaction mixture at about 186–196° C. During the reaction, methanol was evolved. A partial condenser and a total condenser were used in series to return resorcinol to the kettle while the methanol vapors were condensed in the total condenser. After completion of the tris(methoxymethyl)phenol addition, the mixture was held at 190° C. for an additional 59 minutes and then the contents of the kettle discharged into containers. There was produced 41.3 lbs of product. Methanol, 7.2 pounds had been recovered during the reaction. Analysis of the product showed it to be tris(dihydroxybenzyl)phenol and to contain about 26.5% free resorcinol and only a trace of free phenol. The product had a molecular weight of 347 and a Durran softening point of 116.0° C. The viscosity of the product at 25° C. was Z–4 to Z–5 (Gardner viscometer, 50% aqueous solution at pH of 7).

EXAMPLE II

Tris(monohydroxybenzyl)phenol was prepared following the procedure of Example I, part (a), of U.S. 3,285,938. The product was used in the following comparative examples to show the unobvious properties of the dips of the present invention over dips containing this known product.

EXAMPLE III

An adhesive dip was prepared for use with nylon tire cord by mixing 3.75 parts of the product made according to Example I, 57.20 parts water, 2.85 parts of 37% Formalin, 35.08 parts vinylpyridine-styrene-butadiene latex (41% solids, Gen-Tac latex) and 1.12 parts 10% aqueous sodium hydroxide. The dip had a pH of 8.8, a total solids content of 17.72% and a resin to rubber ratio of 1:5.12. This dip was designated as Dip A. Five additional dips were prepared as above, with the pH being adjusted to higher values by additional sodium hydroxide (B–F). A dip was also prepared (Dip G) using the ingredients and amounts of Dip A, but substituting tris(monohydroxybenzyl)phenol prepared as in Example II for the product of Example I. A higher pH was necessary, pH 9.90, to enabe stable dispersions of all ingredients. Four comparable dips to Dip G were made (H–K). Five dips were also prepared (L–P) using a conventional resorcinol-formaldehyde resin, prepared according to the teachings of U.S. 2,385,372 to Rhodes, in place of the product of Example I, at various pH values.

Nylon cord (Du Pont Type 714) of 840 denier, 2-ply with 12/12 twist, was treated with the adhesive dips and cured to natural rubber stock. The results of H-test bonding according to the procedures of ASTM Method D2138–67 (taking an average of 10 specimens) are listed in Table I:

TABLE I

|  | Adhesive dip | Dip pH | Cure conditions Temp., °F. | Time, sec. | ¼″ H-test [1] |
|---|---|---|---|---|---|
| Tris(dihydroxybenzyl)phenol | A | 8.80 | 430 | 40 | 22.0 |
|  | B | 8.80 | 430 | 30 | 22.8 |
|  | C | 9.42 | 430 | 40 | 20.5 |
|  | D | 9.72 | 430 | 40 | 23.4 |
|  | E | 10.13 | 430 | 40 | 20.1 |
|  | F | 10.58 | 430 | 40 | 22.7 |
| Tris(monohydroxybenzyl)phenol | G | 9.90 | 430 | 40 | 4.0 |
|  | H | 10.73 | 430 | 30 | 4.2 |
|  | I | 10.81 | 430 | 40 | 5.8 |
|  | J | 10.87 | 430 | 40 | 7.0 |
|  | K | 10.98 | 430 | 40 | 7.0 |
| Conventional resorcinol-formaldehyde resin | L | 8.88 | 430 | 40 | 21.9 |
|  | M | 9.08 | 430 | 40 | 20.1 |
|  | N | 9.18 | 430 | 40 | 22.8 |
|  | O | 9.37 | 430 | 40 | 22.5 |
|  | P | 9.39 | 430 | 40 | 21.8 |

[1] Pounds at 100±1° C.

Thus, as evident from the data, tris(dihydroxybenzyl)phenol is equal to or better than a resorcinol-formaldehyde resin for bonding of nylon cord to rubber and is greatly superior to tris(monohydroxybenzyl)phenol for such purpose.

EXAMPLE IV

An adhesive dip for rayon tire cord was made by mixing 2.67 parts of the product prepared according to Example I, 63.51 parts water, 1.35 parts 37% Formalin solution, 0.80 part sodium hydroxide (10% aqueous solution), 26.68 parts styrene-butadiene latex (40% solids) and 5.0 parts vinylpyridine-styrene-butadiene latex (41% solids, Gen-Tac latex). The resulting dip had a total solids content of 15%, a resin to rubber ratio of 1:6.36 and a pH of 8.8. This dip was designated as Dip A. Six additional dips were made as above, but the pH adjusted to other values by additional sodium hydroxide (B–G). A dip (Dip H) was made using the composition of Dip A, but substituting tris(monohydroxybenzyl)phenol for the product of Example I. The dip had to be adjusted to a higher pH (9.8) with caustic soda in order to obtain a stable dispersion. Four other dips were made using tris(monohydroxybenzyl)phenol at even higher pH values (I–L). Finally, dips were prepared (M–Q) using a conventional resorcinol-formaldehyde resin prepared according to the teachings of U.S. 2,385,372, in place of tris-(dihydroxybenzyl)phenol at various pH values.

Rayon tire cord (Tyrex Type 220) of 1650 denier, 2-ply 12/12 twist construction, was treated with the various dips and bonded to natural rubber stock. H-test values were obtained following the procedure of ASTM D2138-67 (taking the average of ten values). The results are listed in Table II:

TABLE II

|  | Adhesive dip | Dip pH | Cure conditions | | ¼″ H-test [1] |
|---|---|---|---|---|---|
|  |  |  | Temp., °F. | Time, sec. |  |
| Tris(dihydroxybenzyl)phenol | A | 8.80 | 360 | 40 | 18.7 |
|  | B | 8.80 | 360 | 30 | 10.4 |
|  | C | 9.20 | 360 | 40 | 16.1 |
|  | D | 9.42 | 360 | 40 | 20.5 |
|  | E | 9.72 | 360 | 40 | 23.4 |
|  | F | 10.13 | 360 | 40 | 20.1 |
|  | G | 10.58 | 360 | 40 | 22.7 |
| Tris(monohydroxybenzyl)phenol | H | 9.80 | 360 | 40 | 5.8 |
|  | I | 9.80 | 360 | 30 | 5.8 |
|  | J | 10.73 | 360 | 40 | 7.0 |
|  | K | 10.87 | 360 | 40 | 7.2 |
|  | L | 10.98 | 360 | 40 | 7.0 |
| Conventional resorcinol-formaldehyde resin | M | 8.88 | 360 | 40 | 21.7 |
|  | N | 9.10 | 360 | 40 | 20.3 |
|  | O | 9.23 | 360 | 40 | 22.8 |
|  | P | 9.49 | 360 | 40 | 22.0 |
|  | Q | 9.51 | 360 | 40 | 23.4 |

[1] Pounds at 100±1° C.

As with nylon cord, the tris(dihydroxybenzyl)phenol gives surprising greater adhesion of rayon cord to rubber than does tris(monohydroxybenzyl)phenol.

EXAMPLE V

An adhesive dip for polyester tire cord was made by mixing 4.6 parts of the product prepared according to Example I, 67.37 parts water, and 28.03 parts of a commercial terpolymer latex (vinylpyridinestyrene-butadiene, Gen-Tac latex, 41% solids). The resulting dip had a total solids content of 15.3 percent, a resin to rubber ratio of 1:2.5 and a pH of 8.80. This dip was designated as Dip A. Four additional dips (B-E) were prepared as above, but the pH values modified with 10% aqueous sodium hydroxide. A dip was prepared (Dip F) using the formulation of Dip A, but substituting tris(monohydroxybenzyl)phenol for the product of Example I. The pH of Dip F had to be adjusted by 10% aqueous sodium hydroxide, to a value of 10.60 to obtain solutions of all ingredients. Stable dips could not be prepared using lower pH values. Three other dips (G-I) were prepared, identical to Dip F, but adjusted to higher pH values. Five dips were prepared (J-N), using the composition of Dip A, but substituting a conventional resorcinol-formaldehyde resin for the product of Example I. The resorcinol-formaldehyde resin used was prepared according to the procedure of U.S. 2,385,372. The dips were adjusted to various pH values by 10% aqueous sodium hydroxide. The dips (A-N) were applied to polyester tire cord, Dacron T-68 (1000 denier, 3-ply construction 10.3/10.3 twist), the dip cord cured two minutes at 450° F. and bonded to standard laboratory stock natural rubber. Bonded stock thus prepared was evaluated for T-test adhesion according to ASTM Method D2138-67 (average of ten specimens). The H-test results are listed in Table III:

TABLE III

| Adhesive dip | Adhesive dip | Dip pH | ¼″ H-test [1] |
|---|---|---|---|
| Tris(dihydroxybenzyl)phenol | A | 8.80 | 11.7 |
|  | B | 9.19 | 12.5 |
|  | C | 9.38 | 11.8 |
|  | D | 9.62 | 11.0 |
|  | E | 10.00 | 8.2 |
| Tris(monohydroxybenzyl)phenol | F | 10.60 | 13.2 |
|  | G | 10.82 | 11.6 |
|  | H | 11.12 | 8.6 |
|  | I | 11.48 | 8.5 |
| Conventional resorcinol-formaldehyde resin | J | 8.12 | 7.3 |
|  | K | 8.48 | 6.7 |
|  | L | 8.69 | 6.7 |
|  | M | 8.81 | 6.6 |
|  | N | 9.08 | 6.0 |

[1] Pounds at 100±1° C.

As is shown, whereas the conventional resorcinol-formaldehyde resin gives a totally unacceptable bond for polyester cord to rubber, the tris(dihydroxybenzyl)phenol gives excellent bonds with polyester cord in addition to rayon and nylon cord.

EXAMPLE VI

An adhesive dip was prepared for use with polyester cord by mixing 4.6 parts of the product prepared according to Example I and 67.37 parts water. There was then added 1.15 parts of formaldehyde (37% aqueous solution). Following a two-hours aging period at room temperature, 28.03 parts commercial latex (vinylpyridine-styrenebutadiene, Gen-Tac latex, 41% solids) was then added. The dip was designated as Dip A. A second and third dips were prepared as above, one (Dip B) substituting tris(monohydroxybenzyl)phenol and another (Dip C) substituting a conventional resorcinol-formaldehyde resin prepared according to U.S. 2,385,372, for the tris(dihydroxybenzyl)phenol of Dip A. The dips were used to bond polyester tire cord to natural rubber stock following the procedure of Example V. The results of the H-test are given in Table IV.

TABLE IV

| Adhesive dip | Dip pH | Percent dip pick-up | Cured film state | ¼″ H-test [1] |
|---|---|---|---|---|
| A | 9.08 | 5.20 | Dry | 19.1 |
| B | 10.92 | 6.39 | Very tacky | 15.0 |
| C | 8.51 | 4.33 | Some tack | 11.9 |

[1] Pounds at 100±1° C.

Thus, additional formaldehyde gives even better bonding results when used with tris(dihydroxybenzyl)phenol and significantly greater bonding than either tris(monohydroxybenzyl)phenol or a resorcinolformaldehyde resin.

EXAMPLE VII

A resorcinol-butyraldehyde-formaldehyde resin was prepared generally according to the teachings of U.S. 3,242,118. The resin was prepared by substantially completely reacting at a temperature between 120° C. and the boiling point of the reaction mixture, resorcinol with 0.3 mole of butyraldehyde per mole of resorcinol in the presence of an acid catalyst. The resorcinol-butryaldehyde condensation product was subsequently reacted with 0.4 mole of formaldehyde per mole of resorcinol at about 105° C. to produce a resorcinol-butyraldehyde - formaldehyde resin. This resin (Control) used in place of tris(dihydroxybenzyl)phenol in the composition comparable to that of Dip A of Example V, was used to bond polyester tire cord to rubber stock generally according to the procedure of Example V. A second adhesive dip (Dip Z) was prepared, identical to that of control, except that the resin portion of the dip was replaced with 80% of the resin and 20% tris(dihydroxybenzyl)phenol. This dip was also used to bond polyester cord to rubber. The use of about 20% tris(dihydroxybenzyl)phenol in conjuction with the resorcinol-butyraldehyde-formaldehyde increased the ¼" H-test adhesive (lbs. at 100° C.) by 30%. The value of the control was 13.6 and the value of Dip Z was 17.6. It is thus shown that in addition to being used as the sole resin former in a polyester adhesive dip, the tris(dihydroxybenzyl)phenol can be added to conventional resin dips and will provide markedly increased adhesion of dipper cord to rubber stock.

What is claimed is:

1. An adhesive dip, useful for the bonding of textile material to rubber, comprising an aqueous mixture of a rubber latex selected from the class consisting of vinylpyridine-styrene-butadiene latex, hot polymerized styrene-butadiene latex, cold polymerized styrene-butadiene latex, natural rubber latex, reclaimed rubber dispersion, butyl rubber dispersion and ethylene-propylene-butadiene terpolymer rubber dispersion, tris-(dihydroxybenzyl)phenol, said tris-(dihydroxybenzyl)phenol being present in an amount of about 10–50 parts by weight per 100 parts of rubber in said latex, sufficient alkali to provide a pH of 7.0–13.5, and sufficient water to adjust the solids content of said mixture to about 8–25% by weight.

2. The adhesive dip of claim 1 wherein formaldehyde is added to the dip to provide additional curing.

3. Rubber coated textile tire cord prepared by dipping said cord in the adhesive dip of claim 1.

4. The rubber coated textile tire cord of claim 3 wherein said cord is selected from nylon, rayon, and polyester cord.

5. A polyester tire cord adhesive dip comprising a polyester tire cord adhesive butyraldehyde-resorcinol-formaldehyde resin, a rubber latex, selected from the class consisting of vinylpyridine-styrene-butadiene latex, hot polymerized styrene-butadiene latex, cold polymerized styrene-butadiene latex, natural rubber latex, reclaimed rubber dispersion, butyl rubber dispersion and ethylene-propylene-butadiene terpolymer rubber dispersion, and 5–30 parts per 100 parts of said resin of tris-(dihydroxybenzyl)phenol.

References Cited
UNITED STATES PATENTS

| | | | |
|---|---|---|---|
| 3,367,976 | 2/1968 | Larkin et al. | 260—611 |
| 3,462,382 | 8/1969 | Kolka et al. | |

JOHN C. BLEUTGE, Primary Examiner

J. SEIBERT, Assistant Examiner

U.S. Cl. X.R.

156—110, 335; 117—138.8, 145, 146; 260—29.3, 838, 845, 846, 887, 619